(12) United States Patent
Nakakura

(10) Patent No.: US 10,940,807 B2
(45) Date of Patent: Mar. 9, 2021

(54) MOUNTING DEVICE AND DETECTION SYSTEM

(71) Applicant: Shimano Inc., Osaka (JP)

(72) Inventor: Masahiro Nakakura, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 16/273,438

(22) Filed: Feb. 12, 2019

(65) Prior Publication Data

US 2019/0283688 A1 Sep. 19, 2019

(30) Foreign Application Priority Data

Mar. 14, 2018 (JP) .............................. JP2018-046407

(51) Int. Cl.
*B60R 11/04* (2006.01)
*B62J 11/00* (2020.01)

(52) U.S. Cl.
CPC ............... *B60R 11/04* (2013.01); *B62J 11/00* (2013.01)

(58) Field of Classification Search
CPC .................................. B60R 11/04; B60R 11/06
See application file for complete search history.

(56) References Cited

U.S. PATENT DOCUMENTS

| | | | |
|---|---|---|---|
| 9,280,038 B1 * | 3/2016 | Pan | F16M 11/22 |
| 2009/0195435 A1 * | 8/2009 | Kapilevich | G01S 7/032 |
| | | | 342/22 |
| 2015/0301565 A1 * | 10/2015 | Manullang | G06F 1/182 |
| | | | 361/679.26 |
| 2016/0031381 A1 * | 2/2016 | Lin | B62J 11/00 |
| | | | 224/548 |
| 2016/0083110 A1 | 3/2016 | Pan et al. | |
| 2016/0144961 A1 | 5/2016 | Pan et al. | |
| 2016/0255249 A1 | 9/2016 | Pan et al. | |
| 2016/0339990 A1 * | 11/2016 | Walthert | B62K 25/08 |
| 2017/0026498 A1 * | 1/2017 | Goldfain | H02J 7/342 |
| 2017/0089513 A1 | 3/2017 | Pan et al. | |
| 2018/0035020 A1 | 2/2018 | Pan et al. | |
| 2019/0089871 A1 | 3/2019 | Pan et al. | |
| 2019/0210684 A1 | 7/2019 | Katagiri et al. | |
| 2020/0236250 A1 | 7/2020 | Pan et al. | |

FOREIGN PATENT DOCUMENTS

| | | |
|---|---|---|
| CN | 207072290 U | 3/2018 |
| JP | 2016-97877 A | 5/2016 |
| JP | 2017-504983 A | 2/2017 |
| WO | 2018043569 A1 | 3/2018 |

* cited by examiner

*Primary Examiner* — Derek J Battisti
(74) *Attorney, Agent, or Firm* — Global IP Counselors, LLP

(57) ABSTRACT

A mounting device is provided for mounting a detection device, which is configured to detect electromagnetic waves having a frequency of 30 GHz or greater excluding visible light, on a human-powered vehicle. The detection device includes a support mechanism that is configured to support the detection device so that the detection device is movable relative to the human-powered vehicle in accordance with motion of the human-powered vehicle.

11 Claims, 4 Drawing Sheets

MOUNTING DEVICE AND DETECTION SYSTEM

CROSS-REFERENCE TO RELATED APPLICATIONS

This application claims priority to Japanese Patent Application No. 2018-046407, filed on Mar. 14, 2018. The entire disclosure of Japanese Patent Application No. 2018-046407 is hereby incorporated herein by reference.

BACKGROUND

Technical Field

The present invention generally relates to a mounting device and a detection system.

Background Information

Some conventional human-powered vehicles include a detection device that is configured to detect electromagnetic waves. The detection device is, for example, mounted on a handlebar of the human-powered vehicle. Japanese Laid-Open Patent Publication No 2016-97877 (Patent document 1) discloses an example of a conventional human-powered vehicle having a detection device.

SUMMARY

One object of the present disclosure is to provide a mounting device and a detection system that improves durability of a detection device.

A mounting device in accordance with a first aspect of the present disclosure is for mounting a detection device, which is configured to detect electromagnetic waves having a frequency of 30 GHz or greater excluding visible light, on a human-powered vehicle, and comprises a support mechanism configured to support the detection device so that the detection device is movable relative to the human-powered vehicle in accordance with a motion of the human-powered vehicle. The support mechanism supports the detection device to be movable relative to the human-powered vehicle so that vibration or the like resulting from the motion of the human-powered vehicle is not likely to be transmitted to the detection device. This improves durability of the detection device.

In accordance with a second aspect of the present disclosure, the mounting device according to the first aspect is configured so that the support mechanism includes a rotary base configured to rotate the detection device relative to the human-powered vehicle. The detection device is unlikely to be affected by the posture of the human-powered vehicle. This reduces the processes performed by the detection device in accordance with changes of the posture of the human-powered vehicle.

In accordance with a third aspect of the present disclosure, the mounting device according to the second aspect is configured so that the rotary base includes an actuator configured to rotate the detection device. This allows for the posture of the detection device to be changed in a preferred manner thereby improving the detection accuracy of the detection device.

In accordance with a fourth aspect of the present disclosure, the mounting device according to the third aspect is configured so that the rotary base further includes a posture information detector configured to detect information related to the posture of the detection device, and the actuator is configured to rotate the detection device based on the detection result of the posture information detector. This allows for the posture of the detection device to be changed in a preferred manner thereby improving the detection accuracy of the detection device.

In accordance with a fifth aspect of the present disclosure, the mounting device according to any one of the second to fourth aspects is configured so that the rotary base has three or more degrees of freedom. Accordingly, the posture of the detection device can be changed in a further preferred manner.

In accordance with a sixth aspect of the present disclosure, the mounting device according to any one of the first to fifth aspects is configured so that the support mechanism includes a damper configured to dampen vibration transmitted from the human-powered vehicle to the detection device. The vibration transmitted from the human-powered vehicle to the detection device is dampened. This improves the durability of the detection device and stabilizes the detection result of the detection device.

In accordance with a seventh aspect of the present disclosure, the mounting device according to the sixth aspect is configured so that the damper includes at least one spring. This stabilizes the detection result of the detection device.

In accordance with an eighth aspect of the present disclosure, a mounting device is for mounting a detection device, which is configured to detect electromagnetic waves having a frequency of 30 GHz or greater excluding visible light, on a human-powered vehicle, and comprises a support mechanism configured to support the detection device in an attachable and detachable manner. In a case where the detection device is detached from the support mechanism, the detection device is unlikely to be affected by the ambient environment. This improves the durability of the detection device.

In accordance with a ninth aspect of the present disclosure, the mounting device according to the eighth aspect is configured so that the support mechanism allows the detection device to be mounted so that the detection device is directed toward a predetermined direction. This allows the detection device to be stably coupled to the support mechanism.

In accordance with a tenth aspect of the present disclosure, a mounting device is for mounting a detection device, which is configured to detect electromagnetic waves having a frequency of 30 GHz or greater excluding visible light, on a human-powered vehicle, and comprises a protection structure including a cover configured to protect the detection device. The cover protects the detection device so that the detection device is unlikely to be affected by the ambient environment. This improves the durability of the detection device.

In accordance with an eleventh aspect of the present disclosure, the mounting device according to the tenth aspect is configured so that the protection structure further includes an actuator configured to relatively move the detection device and the cover so that the detection device is arranged at one of a first position where the detection device is protected by the cover and a second position where the detection device is not protected by the cover. This improves the durability of the detection device.

In accordance with a twelfth aspect of the present disclosure, the mounting device according to the eleventh aspect is configured so that the protection structure further includes a traveling state detector configured to detect information related to a traveling state of the human-powered vehicle, and the actuator is configured to relatively move the detection device and the cover in accordance with the detection result of the traveling state detector. This allows the detection device to be protected by the cover in accordance with the traveling state of the human-powered vehicle.

In accordance with a thirteenth aspect of the present disclosure, the mounting device according to the twelfth aspect is configured so that in accordance with the detection result of the traveling state detector, the actuator is configured to arrange the detection device at the second position upon determining the human-powered vehicle is traveling and arrange the detection device at the first position upon determining the human-powered vehicle is not traveling. This allows the detection device to be protected by the cover in a case where the human-powered vehicle is not traveling.

In accordance with a fourteenth aspect of the present disclosure, the mounting device according to the twelfth or thirteenth aspect is configured so that the actuator includes a rack and pinion. This simplifies the structure of the actuator.

In accordance with a fifteenth aspect of the present disclosure, the mounting device according to any one of the first to fourteenth aspects further comprises a mounting unit configured to be mounted on at least one of a handlebar of the human-powered vehicle, a frame of the human-powered vehicle, a front fork of the human-powered vehicle, and a seatpost of the human-powered vehicle. This allows the mounting device to be appropriately coupled to the human-powered vehicle.

In accordance with a sixteenth aspect of the present disclosure, the mounting device according to the fifteenth aspect is configured so that the mounting unit includes a clamp. Accordingly, the mounting device can be easily coupled to the human-powered vehicle.

A detection system in accordance with a seventeenth aspect of the present disclosure comprises the detection device and the mounting device. This improves the durability of the detection device.

In accordance with an eighteenth aspect of the present disclosure, the detection system according to the seventeenth aspect is configured so that the detection device is configured to detect electromagnetic waves including at least one of ultraviolet, infrared, a submillimeter wave, and a millimeter wave. This improves the detection accuracy of the detection device.

In accordance with a nineteenth aspect of the present disclosure, the detection system according to the seventeenth or eighteenth aspect is configured so that the detection device is configured to output an electromagnetic wave having a frequency of 30 GHz or greater excluding visible light and to detect a reflection wave of the output electromagnetic wave. The detection device includes a manner of outputting electromagnetic waves and thereby reduces the number of components in the detection system.

In accordance with a twentieth aspect of the present disclosure, the detection system according to the nineteenth aspect is configured so that the detection device is configured to output an electromagnetic wave including at least one of ultraviolet, infrared, a submillimeter wave, and a millimeter wave and to detect a reflection wave of the output electromagnetic wave. This improves the detection accuracy of the detection device.

The mounting device and the detection system in accordance with the present disclosure improve durability of a detection device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents. In this disclosure, the phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three. Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

First Embodiment

Figure 1:
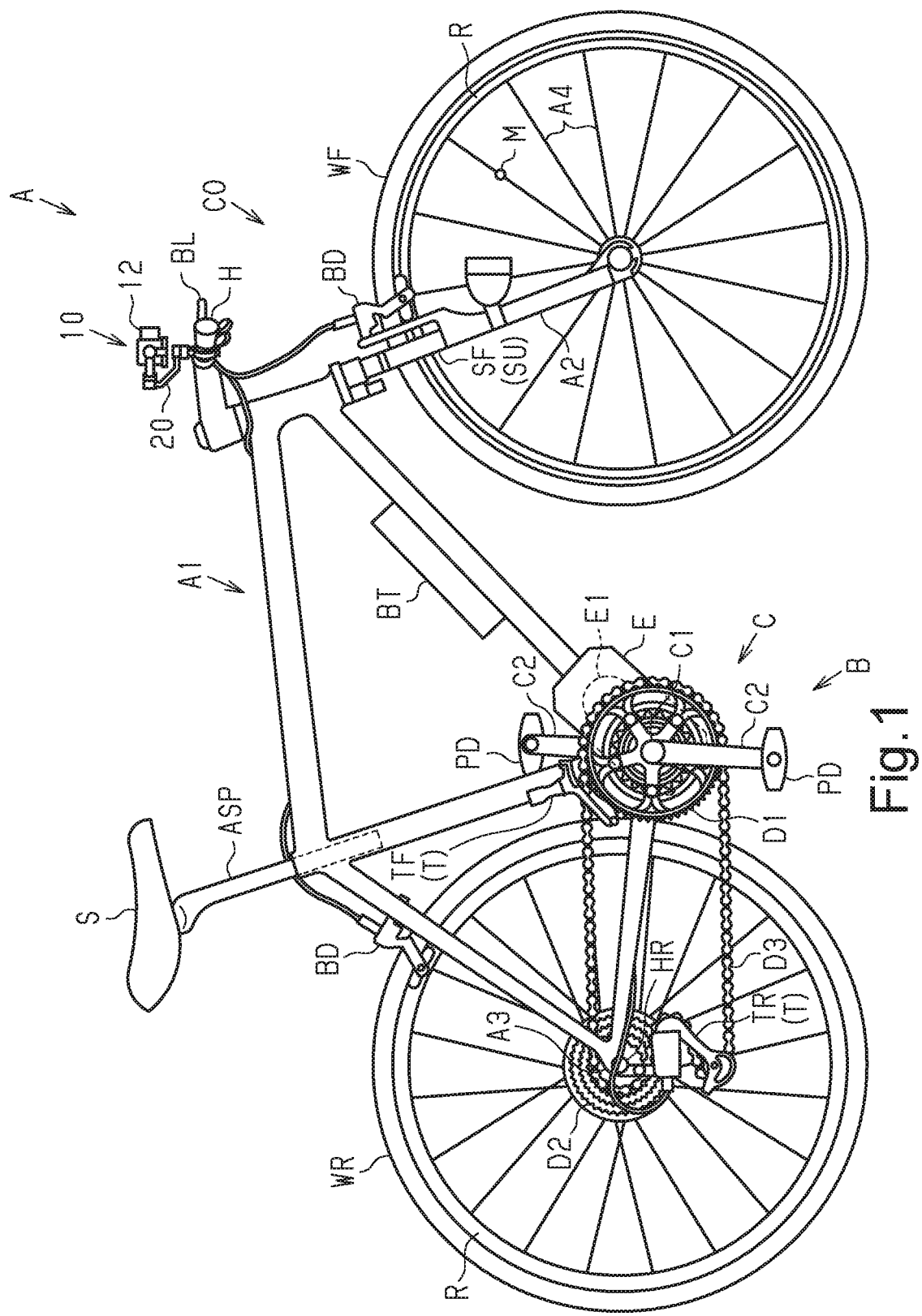
FIG. 1 is a side view of a human-powered vehicle that includes a detection system in accordance with a first embodiment.

A human-powered vehicle A that includes a detection system 10 will now be described with reference to FIG. 1. The human-powered vehicle refers to a vehicle that at least partially uses human force as a prime mover for traveling and includes a vehicle that assists human force with electric power. The human-powered vehicle does not include a vehicle using only a prime mover that is not human force. In particular, the human-powered vehicle does not include a vehicle that only uses an internal combustion engine as the prime mover. The human-powered vehicle is a compact light vehicle that does not require a license for driving on a public road. The illustrated human-powered vehicle A is a bicycle (e-bike) including an electric assist unit E that assists propulsion of the human-powered vehicle A by using electric energy. Specifically, the illustrated human-powered vehicle A is a trekking bike. The human-powered vehicle A further includes a frame A1, a front fork A2, a front wheel WF, a rear wheel WR, a handlebar H, and a drive train B. The drive train B is of a chain drive type. The drive train B includes a crank C, a front sprocket D1, a rear sprocket D2, and a chain D3. The crank C includes a crankshaft C1 and two crank arms C2. The crankshaft C1 is rotatably supported by the frame A1. The two crank arms C2 are provided on two ends of the crankshaft C1, respectively. A pedal PD is rotatably coupled to a distal end of each of the crank arms C2. The drive train B can be of any type, and can be of a belt drive type or a shaft drive type.

The front sprocket D1 is provided on the crank C so as to rotate integrally with the crankshaft C1. The rear sprocket D2 is provided on the hub HR of the rear wheel WR. The chain D3 is wound around the front sprocket D1 and the rear sprocket D2. The driving force added to the pedals PD by a user riding the human-powered vehicle A is transmitted via the front sprocket D1, the chain D3, and the rear sprocket D2 to the rear wheel WR.

The human-powered vehicle A further includes multiple components OC. The components OC include at least one of a pair of brake devices BD, the electric assist unit E, a transmission T, a suspension SU, and an adjustable seatpost ASP. These components OC are driven by electric power supplied from a battery BT, which is mounted on the human-powered vehicle A, or a dedicated electric power supply (not shown). The brake devices BD, the transmission T, the suspension SU, and the adjustable seatpost ASP can be driven mechanically or electrically in response to operation of a corresponding operation device. The elements that are electrically driven among the components OC are actuated by, for example, electric power supplied from the battery BT mounted on the human-powered vehicle A or electric power supplied from a dedicated power supply (not shown) installed in each component OC.

The number of the brake devices BD corresponds to the number of the wheels. In the present embodiment, the human-powered vehicle A includes a first one of the brake devices BD provided on the human-powered vehicle A for applying a braking force to the front wheel WF and a second one of the brake device BD provided on the human-powered vehicle A for applying a braking force to the rear wheel WR. The brake devices BD can have the same structure. The brake devices BD are, for example, rim brake devices that brake rims R of the human-powered vehicle A. In one example, each of the brake devices BD is driven mechanically or electrically in response to operation of a corresponding brake lever BL (operation device). One or both of the brake devices BD can be a disc brake device that is configured to brake a disc brake rotor (not shown) that is mounted on the human-powered vehicle A.

The electric assist unit E functions to assist in propulsion of the human-powered vehicle A. The electric assist unit E functions, for example, in accordance with the driving force applied to the pedals PD. The electric assist unit E includes an electric motor E1.

The transmission T includes at least one of a front derailleur TF and a rear derailleur TR. The front derailleur TF is located in the vicinity of the front sprocket D1 of the frame A1. The front derailleur TF changes the front sprocket D1 around which the chain D3 is wound to change the transmission ratio of the human-powered vehicle A. The rear derailleur TR is provided on a rear end A3 of the frame A1. The rear derailleur TR changes the rear sprocket D2 around which the chain D3 is wound to change the transmission ratio of the human-powered vehicle A. The transmission T can include an internal shifting device such as an internal gear hub.

The suspension SU includes at least one of a front suspension SF and a rear suspension (not shown). The front suspension SF functions to absorb impacts received by the front wheel WF from the road surface. The rear suspension functions to absorb impacts received by the rear wheel WR from the road surface.

The adjustable seatpost ASP is actuated to change the height of a saddle S relative to the frame A1.

Figure 2:
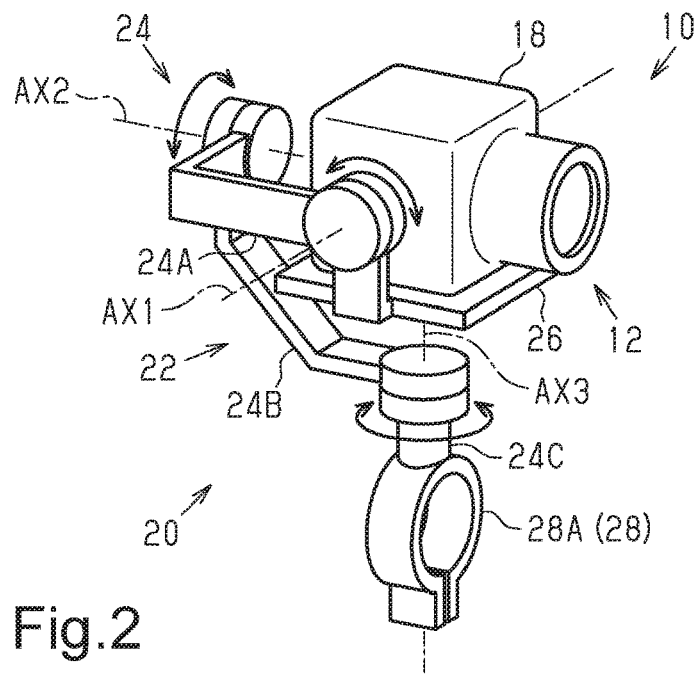
FIG. 2 is a perspective view of the detection system shown in FIG. 1.

The configuration of the detection system 10 will now be described with reference to FIGS. 2 to 4. As shown in FIG. 2, the detection system 10 includes a detection device 12 and a mounting device 20. The mounting device 20 is a device for mounting the detection device 12 on the human-powered vehicle A. The detection device 12 is configured to detect electromagnetic waves having a frequency of 30 GHz or greater excluding visible light. The definition of visible light is pursuant to the standard specified by International Organization for Standardization (ISO). For example, the range of frequencies of visible light is approximately 400 THz to 790 THz. The detection device 12 outputs an electromagnetic wave having a frequency that is greater than or equal to 30 GHz and excluding frequencies in the visible light range. The detection device 12 detects a reflected electromagnetic wave. The detection system 10 is actuated by, for example, electric power supplied from the battery BT or electric power supplied from a dedicated power supply (not shown).

Preferably, the detection device 12 is configured to detect electromagnetic waves including at least one of ultraviolet, infrared, a submillimeter wave, and a millimeter wave. Further preferably, the detection device 12 is configured to output an electromagnetic wave having a frequency of 30 GHz or greater excluding visible light and detect a reflection wave of the output electromagnetic wave. Further preferably, the detection device 12 is configured to output an electromagnetic wave including at least one of ultraviolet, infrared, a submillimeter wave, and a millimeter wave and to detect a reflection wave of the output electromagnetic wave. The detection device 12 includes, for example, a configuration related to a light detection and ranging (Li-DAR). In other words, one example of the detection device 12 is a lidar detector that is configured to output an electromagnetic wave and then detect a reflected electromagnetic wave.

Figure 3:
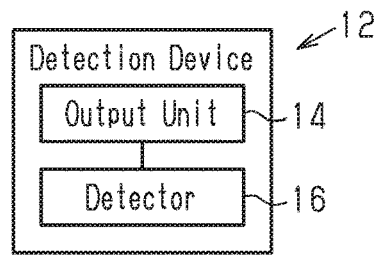
FIG. 3 is a block diagram showing the configuration of the detection system shown in FIG. 2.

As shown in FIG. 3, the detection device 12 includes an output unit 14 and a detector 16. The output unit 14 outputs an electromagnetic wave to the surrounding of the human-powered vehicle A. The surrounding of the human-powered vehicle A includes an area located in at least one of forward (traveling direction), sideward, and rearward directions from the human-powered vehicle A. The detector 16 detects the electromagnetic wave output from the output unit 14. Specifically, the output unit 14 outputs an electromagnetic wave, and the detector 16 detects a reflection wave of the electromagnetic wave reflected by an object or the like present in the surrounding of the human-powered vehicle A. In the present embodiment, the output unit 14 outputs electromagnetic waves including at least one of ultraviolet, infrared, a submillimeter wave, and a millimeter wave, and the detector 16 detects reflection waves of the electromagnetic waves. The output unit 14, for example, includes a light source such as a laser. The detector, for example, includes a light sensor such as a photodetector. The detector 16 outputs information included in the detected reflection electromagnetic waves to a control device (not shown) mounted on the human-powered vehicle A. The control device is an electronic controller that includes central processing unit (CPU) or a micro-processing unit (MPU). The terms "electronic controller" or "controller" as used herein refers to hardware that executes a software program. The terms "electronic controller" or "controller" as used herein do not include humans. In one example, the control device controls various components CO in accordance with the information obtained from the detector 16. The output unit 14 and the detector 16 are, for example, accommodated in a housing 18 (refer to FIG. 2). Preferably, the housing 18 is constructed by a material that transmits electromagnetic waves therethrough.

As shown in FIG. 2, the mounting device 20 includes a support mechanism 22 that is configured to support the detection device 12 so that the detection device 12 is movable relative to the human-powered vehicle A in accordance with motion of the human-powered vehicle A. For example, the support mechanism 22 supports the detection device 12 to direct the detection device 12 toward a predetermined direction. In one example, the predetermined direction is a direction extending toward the front of the human-powered vehicle A. The support mechanism 22 includes a rotary base 24 configured to rotate the detection device 12 relative to the human-powered vehicle A. Preferably, the rotary base 24 has three or more degrees of freedom. One example of the rotary base 24 is a gimbal. The rotary base 24 can have one or two degrees of freedom.

The rotary base 24 includes a first portion 24A, a second portion 24B, a third portion 24C, and a rotation support base 26. The rotation support base 26 is configured to support the detection device 12. For example, the rotation support base 26 is rotatably coupled to the first portion 24A to rotate relative to the first portion 24A. Specifically, the rotation support base 26 is coupled to the first portion 24A to be rotatable about an axis extending in a sideward direction of the human-powered vehicle A (hereafter, "the first axis AX1"). For example, the first portion 24A is rotatably coupled to the second portion 24B to rotate relative to the second portion 24B. Specifically, the first portion 24A is coupled to the second portion 24B to be rotatable about an axis extending in a front-rear direction of the human-powered vehicle A (hereafter, "the second axis AX2"). For example, the second portion 24B is rotatably coupled to the third portion 24C to rotate relative to the third portion 24C. Specifically, the second portion 24B is coupled to the third portion 24C to be rotatable about an axis extending in a vertical direction of the human-powered vehicle A (hereafter "the third axis AX3").

The mounting device 20 further includes a mounting unit 28 configured to be mounted on at least one of the handlebar H of the human-powered vehicle A, the frame A1 of the human-powered vehicle A, the front fork A2 of the human-powered vehicle A, and a seatpost of the human-powered vehicle A (the adjustable seatpost ASP in present embodiment). In the present embodiment, the mounting unit 28 is configured to be mounted on the handlebar H. The mounting unit 28 is provided on the support mechanism 22. In the example shown in FIG. 2, the mounting unit 28 is provided on the third portion 24C of the rotary base 24. The mounting unit 28 includes a clamp 28A. The mounting unit 28 is mounted on the handlebar H so that the detection device 12 is in a state mounted on the handlebar H (refer to FIG. 1).

Figure 4:
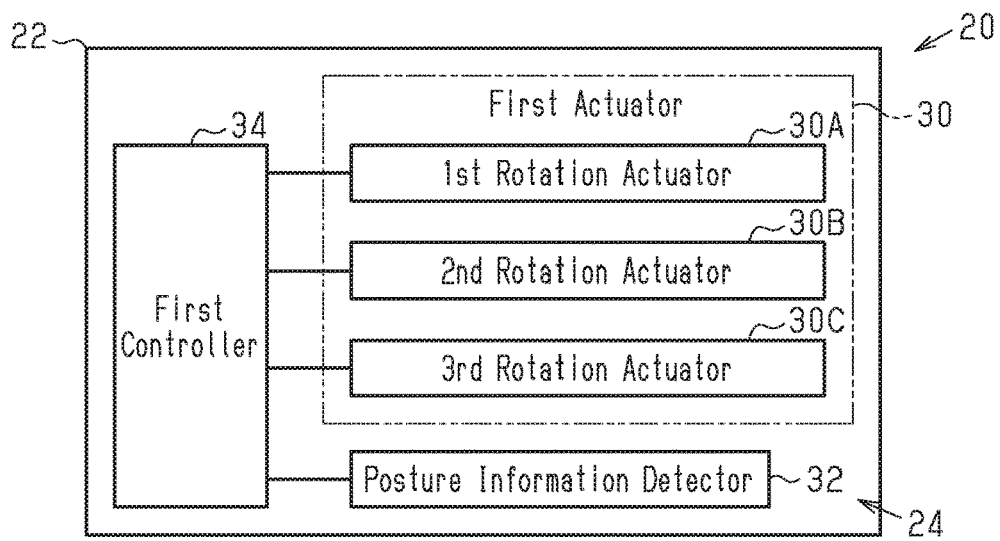
FIG. 4 is a block diagram showing the configuration of a mounting device shown in FIG. 2.

As shown in FIG. 4, the rotary base 24 further includes a first actuator 30 configured to rotate the detection device 12. The first actuator 30 includes a first rotary actuator 30A, a second rotary actuator 30B, and a third rotary actuator 30C. For example, the first rotary actuator 30A is provided on the first portion 24A. The first rotary actuator 30A is configured to rotate the rotation support base 26 relative to the first portion 24A. The first rotary actuator 30A includes an electric motor (not shown). In one example, the first rotary actuator 30A rotates the rotation support base 26 about the first axis AX1 so that the detection device 12 is rotated about the first axis AX1.

For example, the second rotary actuator 30B is provided on the second portion 24B. The second rotary actuator 30B is configured to rotate the first portion 24A relative to the second portion 24B. The second rotary actuator 30B includes an electric motor (not shown). In one example, the second rotary actuator 30B rotates the first portion 24A about the second axis AX2 so that the rotation support base 26 is rotated about the second axis AX2. This rotates the detection device 12 about the second axis AX2.

For example, the third rotary actuator 30C is provided on the third portion 24C. The third rotary actuator 30C is configured to rotate the second portion 24B relative to the third portion 24C. The third rotary actuator 30C includes an electric motor (not shown). In one example, the third rotary actuator 30C rotates the second portion 24B about the third axis AX3 so that the first portion 24A and the rotation support base 26 are rotated about the third axis AX3. This rotates the detection device 12 about the third axis AX3. In a case where the rotary base 24 has one or two degrees of freedom, at least one of the first rotary actuator 30A, the second rotary actuator 30B, and the third rotary actuator 30C are omitted from the first actuator 30.

The rotary base 24 further includes a posture information detector 32 configured to detect information related to the posture of the detection device 12. The information related to the posture of the detection device 12 includes, for example, the posture of the detection device 12 relative to the human-powered vehicle A. Preferably, the posture information detector 32 is provided at a portion of the mounting device 20 where the posture of the detection device 12 can be reflected in a desirable manner. In one example, the posture information detector 32 is provided on the mounting unit 28 of the mounting device 20. The posture information detector 32 includes a gyro sensor. The first actuator 30 is configured to rotate the detection device 12 based on the detection result of the posture information detector 32.

The support mechanism 22 further includes a first controller 34 that controls the first actuator 30 based on the detection result of the posture information detector 32. The first controller 34 is an electronic controller that includes a CPU or an MPU. Preferably, the first controller 34 includes one or more processors and one or more storage devices. The storage device stores programs used by the first controller 34. The storage device is any computer storage device or any computer readable medium with the sole exception of a transitory, propagating signal. For example, the memory device can be nonvolatile memory and volatile memory, and can includes a ROM (Read Only Memory) device, a RAM (Random Access Memory) device, a hard disk, a flash drive, etc. In one example, the first controller 34 controls the first actuator 30 based on the detection result of the posture information detector 32 so that the posture of the detection device 12 relative to the road, on which the human-powered vehicle A is traveling, will not be greatly changed by vibration or the like resulting from the motion of the human-powered vehicle A. The posture of the detection device 12 relative to the road is the posture of the detection device 12 relative to a flat portion of the road. Specifically, the first controller 34 controls the first to third rotary actuators 30A to 30C based on the detection result of the posture information detector 32 so that the posture of the detection device 12 relative to the road is maintained at a predetermined posture. The predetermined posture is, for example, the posture of the detection device 12 in which the detection device 12 is directed toward the front of the human-powered vehicle A. This stabilizes the posture of the detection device 12 and improves the detection accuracy of the detection device 12.

Second Embodiment

Figure 5:
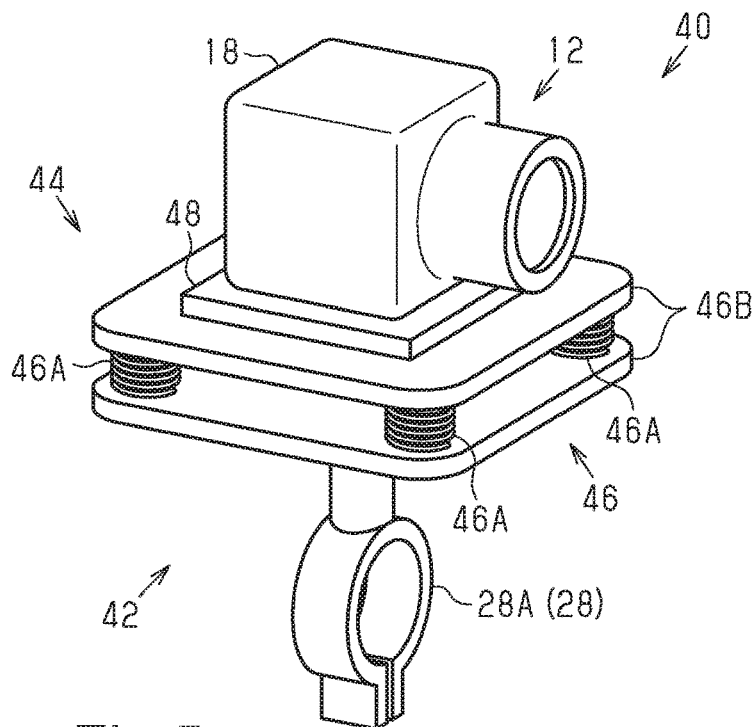
FIG. 5 is a perspective view of a detection system in accordance with a second embodiment.

A detection system 40 in accordance with the second embodiment will now be described with reference to FIG. 5. Same reference numerals are given to those components that are the same as the corresponding components of the first embodiment. Such components will not be described in detail.

The detection system 40 includes the detection device 12 and a mounting device 42. The mounting device 42 is for mounting the detection device 12 on the human-powered vehicle A. The detection device 12 is configured to detect electromagnetic waves having a frequency of 30 GHz or greater excluding visible light as mentioned above. The mounting device 42 includes a support mechanism 44 configured to support the detection device 12 so that the detection device 12 is movable relative to the human-powered vehicle A in accordance with the motion of the human-powered vehicle A. For example, the support mechanism 44 supports the detection device 12 so that the detection device 12 is directed toward a predetermined direction. In one example, the predetermined direction is a direction extending toward the front of the human-powered vehicle A.

The support mechanism 44 includes a damper 46 configured to dampen vibration transmitted from the human-powered vehicle A to the detection device 12. The damper 46 includes one or more springs 46A. In the present embodiment, the number of the springs 46A is preferably four, but can be more or less than four. The damper 46 further includes two support plates 46B that support the springs 46A. In one example, the damper 46 is configured by arranging four of the springs 46A between one of the support plates 46B and the other one of the support plates 46B.

The support mechanism 44 further includes a support base 48 that is configured to support the detection device 12. For example, the support base 48 is provided on one of the support plates 46B. The support base 48 can be omitted from the support mechanism 44. In this case, the detection device 12 is supported by one of the support plates 46B. The mounting device 42 further includes the mounting unit 28. In the example shown in FIG. 5, the mounting unit 28 is provided on the other one of the support plates 46B. The support mechanism 44 can include the rotary base 24. In this case, preferably, the damper 46 is provided on the third portion 24C of the rotary base 24.

Third Embodiment

Figure 6:
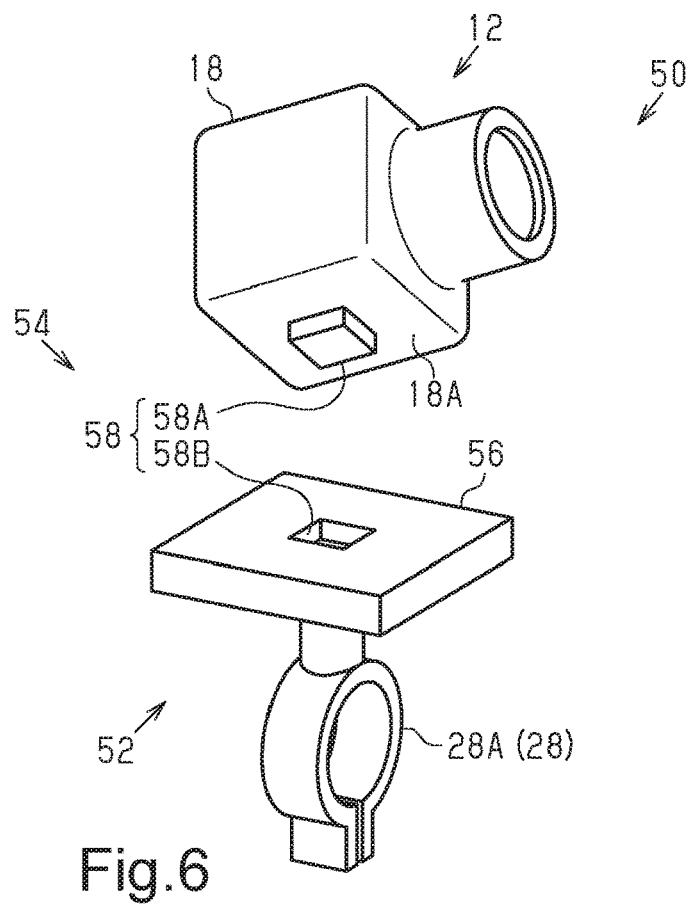
FIG. 6 is an exploded perspective view of a detection system in accordance with a third embodiment.

A detection system 50 in accordance with the third embodiment will now be described with reference to FIG. 6. Same reference numerals are given to those components that are the same as the corresponding components of the first embodiment. Such components will not be described in detail.

The detection system 50 includes the detection device 12 and a mounting device 52. The mounting device 52 is for mounting the detection device 12 on the human-powered vehicle A. The detection device 12 is configured to detect electromagnetic waves having a frequency of 30 GHz or greater excluding visible light as mentioned above. The mounting device 52 includes a support mechanism 54 configured to support the detection device 12 in an attachable and detachable manner. The support mechanism 54 allows the detection device 12 to be mounted so that the detection device 12 is directed toward a predetermined direction. That is, the support mechanism 54 supports the detection device 12 so that the detection device 12 is directed toward the predetermined direction. In one example, the predetermined direction is a direction extending toward the front of the human-powered vehicle A. The support mechanism 54 includes a support base 56 configured to support the detection device 12. The mounting device 52 further includes the mounting unit 28. In the example shown in FIG. 6, the mounting unit 28 is provided on the support base 56.

The support mechanism 54 further includes an attachment-detachment structure 58 configured to allow the detection device 12 and the support mechanism 54 to be attachable and detachable. The attachment-detachment structure 58 includes a first attachment-detachment portion 58A and a second attachment-detachment portion 58B that are attachable with each other and detachable from each other will practically no damage occurring due to attachment and detachment except for ordinary wear and tear. For example, the first attachment-detachment portion 58A is provided on the housing 18 of the detection device 12. Specifically, the first attachment-detachment portion 58A is provided on a bottom portion 18A of the housing 18. For example, the second attachment-detachment portion 58B is provided on the support base 56. The support base 56 can be omitted from the support mechanism 54. In this case, the second attachment-detachment portion 58B is provided on the mounting unit 28.

The first attachment-detachment portion 58A and the second attachment-detachment portion 58B can be configured to be attached and detached in response to operation of an operator (not shown), and can be configured to be attached and detached by engaging force applied to each other. In one example, the first attachment-detachment portion 58A is attached to the second attachment-detachment portion 58B so that the support mechanism 54 supports the detection device 12. Further, the first attachment-detachment portion 58A is separated from the second attachment-detachment portion 58B so as to remove the detection device 12 from the support mechanism 54. The support mechanism 54 can include at least one of the rotary base 24 and the damper 46.

Fourth Embodiment

A detection system 60 in accordance with the fourth embodiment will now be described with reference to FIGS. 7 and 8. Same reference numerals are given to those components that are the same as the corresponding components of the first embodiment. Such components will not be described in detail.

Figure 7:
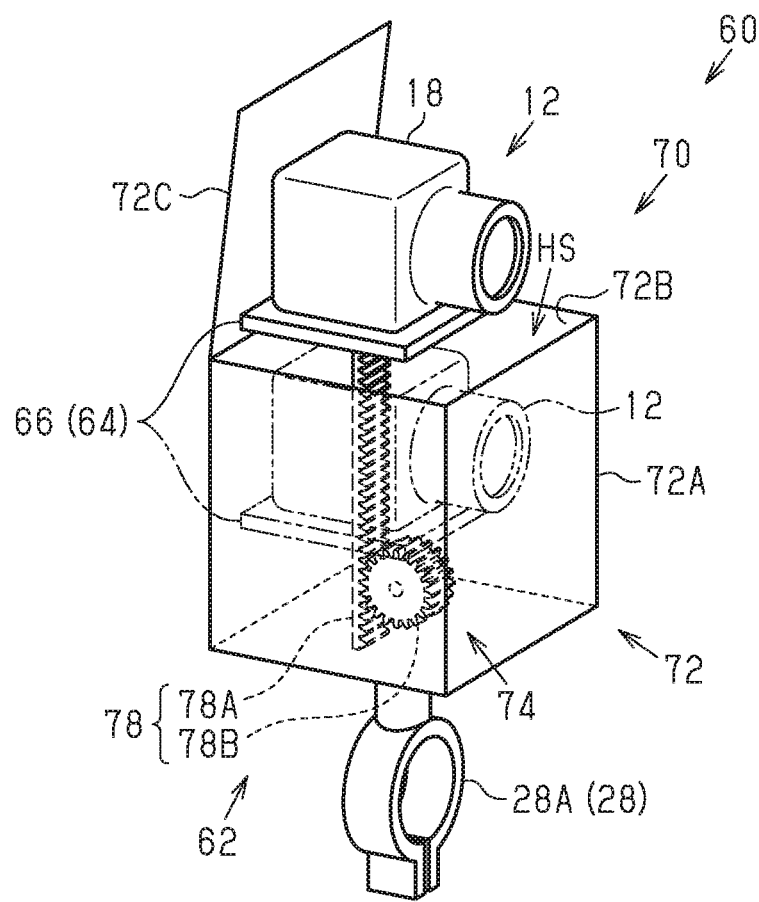
FIG. 7 is a perspective view of a detection system in accordance with a fourth embodiment.

As shown in FIG. 7, the detection system 60 includes the detection device 12 and a mounting device 62. The mounting device 62 is for mounting the detection device 12 on the human-powered vehicle A. The detection device 12 is configured to detect electromagnetic waves having a frequency of 30 GHz or greater excluding visible light as mentioned above. The mounting device 62 includes a support mechanism 64 that includes a support base 66 configured to support the detection device 12. For example, the support mechanism 64 supports the detection device 12 so that the detection device 12 is directed toward a predetermined direction. In one example, the predetermined direction is a direction extending toward the front of the human-powered vehicle A.

The mounting device 62 further includes a protection structure 70 including a cover 72 that is configured to protect the detection device 12. The cover 72 includes an accommodation space HS that is large enough to accommodate at least part of the detection device 12. In the present embodiment, the accommodation space HS is large enough to entirely accommodate the detection device 12. The cover 72 includes a main cover body 72A and a lid 72C. The main cover body 72A accommodates the detection device 12. The lid 72C is configured to close an opening 72B of the main cover body 72A. For example, the lid 72C is coupled to the main cover body 72A by a hinge (not shown). The lid 72C can be omitted from the cover 72. The mounting device 62 further includes the mounting unit 28. In one example, the mounting unit 28 is provided on the main cover body 72A.

The protection structure 70 further includes a second actuator 74 that is configured to relatively move the detection device 12 and the cover 72 so that the detection device 12 is arranged at one of a first position and a second position. In the first position, the detection device 12 is protected by the cover 72. In the second position, the detection device 12 is not protected by the cover 72. The double-dashed lines in FIG. 7 show the detection device 12 at the first position and the solid lines in FIG. 7 show the detection device 12 at the second position.

The second actuator 74 includes a rack and pinion 78. The rack and pinion 78 includes a rack 78A and a pinion 78B that engage with each other. In one example, in a case where the pinion 78B is rotated, the rack 78A is moved relative to the pinion 78B in the vertical direction of the human-powered vehicle A. For example, the support base 66 of the support mechanism 64 is attached to a distal end of the rack 78A. The support mechanism 64 can be omitted from the mounting device 62. In this case, the bottom portion 18A of the detection device 12 is attached to the distal end of the rack 78A. The second actuator 74 further includes an electric motor (not shown). In one example, the electric motor is driven to rotate the pinion 78B and move the rack 78A relative to the pinion 78B in the vertical direction of the human-powered vehicle A. This moves the detection device 12 relative to the cover 72 in the vertical direction of the human-powered vehicle A. For example, the lid 72C of the cover 72 opens and closes the opening 72B by contacting the detection device 12.

Figure 8:
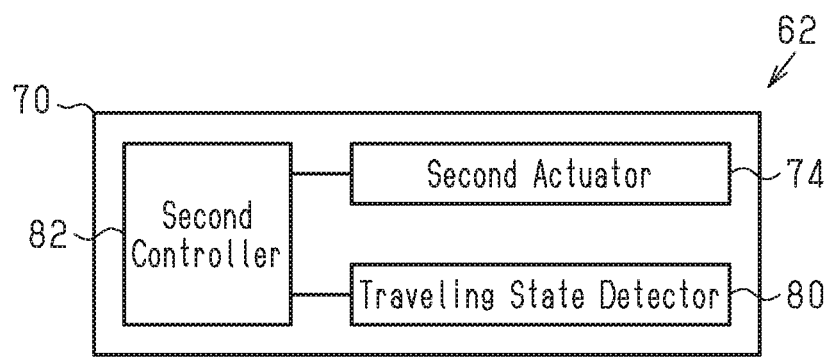
FIG. 8 is a block diagram showing the configuration of the mounting device shown in FIG. 7.

As shown in FIG. 8, the protection structure 70 further includes a traveling state detector 80 that is configured to detect information related to a traveling state of the human-powered vehicle A. The information related to the traveling state of the human-powered vehicle A includes at least one of speed, acceleration, power, cadence, and torque applied to the crank C of the human-powered vehicle A. In the present embodiment, the traveling state detector 80 is configured to detect the speed of the human-powered vehicle A. For example, the traveling state detector 80 includes a magnetometer that detects a magnet M (refer to FIG. 1) provided on a spoke A4 of the front wheel WF. In one example, the traveling state detector 80 is provided on the front fork A2 (not shown). The traveling state detector 80 detects the magnet M to detect the rotational speed of the front wheel WF. Consequently, the speed of the human-powered vehicle A is detected.

The second actuator 74 is configured to relatively move the detection device 12 and the cover 72 in accordance with the detection result of the traveling state detector 80. Specifically, in accordance with the detection result of the traveling state detector 80, the second actuator 74 is configured to arrange the detection device 12 at the second position if the human-powered vehicle A is traveling and arrange the detection device 12 at the first position if the human-powered vehicle A is not traveling. In a case where the human-powered vehicle A is not traveling, the speed of the human-powered vehicle A can be detected as 0 km/h by the traveling state detector 80.

The protection structure 70 further includes a second controller 82 that controls the second actuator 74 in accordance with the detection result of the traveling state detector 80. The second controller 82 is an electronic controller that includes a CPU or an MPU. Preferably, the second controller 82 includes one or more processors and one or more storage devices. The storage device stores programs used by the second controller 82. The storage device is any computer storage device or any computer readable medium with the sole exception of a transitory, propagating signal. For example, the memory device can be nonvolatile memory and volatile memory, and can includes a ROM (Read Only Memory) device, a RAM (Random Access Memory) device, a hard disk, a flash drive, etc. In one example, in a case where it is determined that the human-powered vehicle A is traveling in accordance with the detection result of the traveling state detector 80, the second controller 82 controls the second actuator 74 so that the detection device 12 is arranged at the second position. Further, in a case where it is determined that the human-powered vehicle A is not traveling in accordance with the detection result of the traveling state detector 80, the second controller 82 controls the second actuator 74 so that the detection device 12 is arranged at the first position. The support mechanism 64 can include at least one of the rotary base 24, the damper 46, and the attachment-detachment structure 58.

Modifications

The descriptions related to the above embodiments exemplify, without any intention to limit, applicable forms of a mounting device and a detection system according to the present disclosure. In addition to the embodiments described above, the mounting device and the detection system according to the present disclosure are applicable to, for example, modifications of the above embodiments that are described below and combinations of at least two of the modifications that do not contradict each other. In the modified examples described hereafter, same reference numerals are given to those components that are the same as the corresponding components of the above embodiments. Such components will not be described in detail.

The configuration of the second actuator 74 can be modified in any manner. In one example, the second actuator 74 includes a ball screw. The structure of the protection structure 70 can be modified in any manner. In a first example, the cover 72 is attached to the distal end of the rack 78A. In this case, the cover 72 is moved relative to the detection device 12 in the vertical direction of the human-powered vehicle A. In this example, the mounting unit 28 is provided on the detection device 12 or the support base 66. In a second example, the traveling state detector 80 is omitted from the protection structure 70. In this case, the second controller 82 controls the second actuator 74 in response to operation of an operator (not shown).

The structure of the damper 46 can be modified in any manner. In one example, the damper 46 includes one or more elastic members. In one example, the elastic member is a rubber member. The structure of the detection device 12 can be modified in any manner. In one example, the output unit 14 is provided separately from the detection device 12. In this case, the output unit 14 outputs electromagnetic waves having a frequency of 30 GHz or greater excluding visible light, and the detection device 12 detects the reflection wave of the electromagnetic waves.

The human-powered vehicle A can be of any type. In the first example, the human-powered vehicle A is a road bike, a mountain bike, a cross bike, a city cycle, a cargo bike, or a recumbent bicycle. In the second example, the human-powered vehicle A is a kick scooter.

What is claimed is:

1. A mounting device for mounting a detection device on a human-powered vehicle, the detection device being configured to detect electromagnetic waves having a frequency of 30 GHz or greater excluding visible light, the mounting device comprising:
    a protection structure including a cover configured to protect the detection device, the protection structure further including an actuator configured to relatively move the detection device and the cover so that the detection device is arranged at one of a first position where the detection device is protected by the cover and a second position where the detection device is not protected by the cover,
    the actuator being configured to relatively move the detection device and the cover in accordance with movement of the human-powered vehicle.

2. The mounting device according to claim 1, wherein the protection structure further includes a traveling state detector configured to detect information related to movement of the human-powered vehicle.

3. The mounting device according to claim 2, wherein in accordance with the detection result of the traveling state detector, the actuator is configured to arrange the detection device at the second position upon determining the human-powered vehicle is traveling and arrange the detection device at the first position upon determining the human-powered vehicle is not traveling.

4. The mounting device according to claim 2, wherein the actuator includes a rack and pinion.

5. The mounting device according to claim 1, further comprising
    a mounting unit configured to be mounted on at least one of a handlebar of the human-powered vehicle, a frame of the human-powered vehicle, a front fork of the human-powered vehicle, and a seatpost of the human-powered vehicle.

6. The mounting device according to claim 5, wherein the mounting unit includes a clamp.

7. A detection system comprising the mounting device according to claim 1, and further comprising:
    the detection device.

8. The detection system according to claim 7, wherein the detection device is configured to detect electromagnetic waves including at least one of ultraviolet, infrared, a submillimeter wave, and a millimeter wave.

9. The detection system according to claim 7, wherein the detection device is configured to output an electromagnetic wave having a frequency of 30 GHz or greater excluding visible light and to detect a reflection wave of the output electromagnetic wave.

10. The detection system according to claim 9, wherein the detection device is configured to output an electromagnetic wave including at least one of ultraviolet, infrared, a submillimeter wave, and a millimeter wave and to detect a reflection wave of the output electromagnetic wave.

11. The mounting device according to claim 1, wherein the support mechanism allows the detection device to be mounted so that the detection device is directed toward a predetermined direction.

\* \* \* \* \*